United States Patent
Hirota et al.

(10) Patent No.: US 8,539,757 B2
(45) Date of Patent: Sep. 24, 2013

(54) EXHAUST PURIFICATION APPARATUS FOR INTERNAL COMBUSTION ENGINE

(75) Inventors: Shinya Hirota, Susono (JP); Toru Sasatani, Kariya (JP); Sakutaro Hoshi, Kariya (JP); Hiroshi Fujimoto, Susono (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 61 days.

(21) Appl. No.: 12/990,816

(22) PCT Filed: Jan. 14, 2010

(86) PCT No.: PCT/JP2010/000184
§ 371 (c)(1),
(2), (4) Date: Nov. 3, 2010

(87) PCT Pub. No.: WO2010/082493
PCT Pub. Date: Jul. 22, 2010

(65) Prior Publication Data
US 2011/0258989 A1    Oct. 27, 2011

(30) Foreign Application Priority Data
Jan. 16, 2009  (JP) .................................. 2009-007627

(51) Int. Cl.
*F01N 3/00*   (2006.01)
(52) U.S. Cl.
USPC ............... 60/286; 60/277; 60/287; 60/295; 60/300; 60/301; 60/303
(58) Field of Classification Search
USPC ............... 60/277, 282, 284, 286, 287, 295, 60/297, 300, 301, 303, 311
See application file for complete search history.

(56) References Cited

U.S. PATENT DOCUMENTS

| 5,848,530 A | * | 12/1998 | Matsuoka et al. | ............... 60/277 |
| 2003/0187568 A1 | * | 10/2003 | Yasui et al. | .................... 701/109 |

(Continued)

FOREIGN PATENT DOCUMENTS

| JP | A-11-210447 | 8/1999 |
| JP | A-2007-315233 | 12/2007 |

(Continued)

OTHER PUBLICATIONS

International Search Report issued in Application No. PCT/JP2010/000184; dated Apr. 20, 2010 (with translation).

(Continued)

*Primary Examiner* — Binh Q Tran
*Assistant Examiner* — Jorge Leon, Jr.
(74) *Attorney, Agent, or Firm* — Oliff & Berridge, PLC

(57) ABSTRACT

An exhaust purification apparatus for an internal combustion engine according to the present invention includes a heated gas generation apparatus configured to generate heated gas utilizing exhaust gas flowing through an exhaust passage. The heated gas generation apparatus includes a catalyst configured to provide an oxidation function, a fuel supply nozzle, and a heater. An exhaust purification unit is provided downstream of the heated gas generation apparatus. An incoming gas temperature of the exhaust purification unit is detected and estimated. An actual incoming gas temperature being a detected value and an estimated incoming gas temperature both acquired when at least the fuel supply nozzle is actuated are compared with each other. Based on the result of the comparison, the apparatus detects one of poisoning of the catalyst with HC and degradation of the catalyst. Thus, the heated gas generation apparatus is prevented from discharging HC.

5 Claims, 8 Drawing Sheets

(56) References Cited

U.S. PATENT DOCUMENTS

| | | | |
|---|---|---|---|
| 2006/0225407 A1* | 10/2006 | Tahara et al. | 60/286 |
| 2009/0084091 A1* | 4/2009 | Tsujimoto et al. | 60/299 |
| 2009/0158716 A1 | 6/2009 | Tsukamoto et al. | |
| 2010/0162687 A1* | 7/2010 | Thouvenel et al. | 60/277 |

FOREIGN PATENT DOCUMENTS

| | | |
|---|---|---|
| JP | A-2008-038634 | 2/2008 |
| JP | A-2008-106685 | 5/2008 |
| WO | WO 2007/128937 A2 | 11/2007 |
| WO | WO 2009/008450 A1 | 1/2009 |

OTHER PUBLICATIONS

Jun. 11, 2012 Search Report issued in European Patent Application No. 10731162.3.

International Preliminary Report on Patentability and Written Opinion of International Searching Authority issued in Application No. PCT/JP2010/000184 dated Aug. 16, 2011.

* cited by examiner

EXHAUST PURIFICATION APPARATUS FOR INTERNAL COMBUSTION ENGINE

TECHNICAL FIELD

The present invention relates to an exhaust purification apparatus for an internal combustion engine, and in particular, to an exhaust purification apparatus for an internal combustion engine including a heated gas generation apparatus suitable for heating an exhaust purification catalyst such as an NOx catalyst.

BACKGROUND ART

As is well known, exhaust temperature is lower in internal combustion engines such as diesel engines in which combustion occurs in an excessive oxygen (lean) state than in gasoline engines in which combustion occurs in a stoichiometric state. The low exhaust temperature makes activation of an exhaust purification catalyst difficult; the exhaust purification catalyst is, for example, an NOx catalyst and is installed in an exhaust passage. In particular, in an internal combustion engine mounted in a vehicle, an exhaust purification catalyst is installed away from a combustion chamber of the internal combustion engine or installed under the floor of the vehicle and thus exposed to a wind flow. Thus, disadvantageously, increasing the temperature of the exhaust purification catalyst is difficult, resulting in the difficulty of activating the exhaust purification catalyst. Furthermore, there has been a demand to activate the exhaust purification catalyst earlier during the cold start of the internal combustion engine.

To prevent this, such a heated gas generation apparatus as described below has been provided. The apparatus includes a first catalyst and a second catalyst each provided in an exhaust passage located upstream of the exhaust purification catalyst, the first and second catalysts each providing an oxidation function, and a fuel supply valve allowing fuel to be supplied to the first catalyst. The supplied fuel is sequentially combusted by the first and second catalysts to generate hot heated gas. The generated heated gas can be used to heat the downstream exhaust purification catalyst.

On the other hand, as an exhaust purification catalyst, a selective reductive NOx catalyst (what is called urine SCR) is known which continuously reduces NOx in exhaust gas using a urea aqueous solution serving as a reducing agent. In an exhaust purification apparatus using the selective reduction NOx catalyst, the urea aqueous solution is evaporated by exhaust heat or catalytic heat and thus hydrolyzed to generate ammonia. The ammonia and NOx react with each other in the catalyst to reduce and purify the NOx.

The selective reduction NOx catalyst is expected to be heated by heated gas generated by the heated gas generation apparatus. However, in this case, when hydrocarbon HC that is a combustion residue of fuel is discharged from the heated gas generation apparatus, the discharged HC may disadvantageously suppress the reaction between ammonia and NOx in the NOx catalyst or poison the NOx catalyst with HC. Thus, the amount of fuel supplied needs to be controlled so as to prevent the heated gas generation apparatus from discharging HC.

Patent Document 1 discloses that in order to prevent the selective reduction NOx catalyst from being poisoned with SOF, the amount of reducing agent supplied is determined so as to set the concentration of HC to the upper limit value at which the NOx catalyst is prevented from being poisoned with HC.

However, performing only such fuel supply amount control is insufficient. That is, if the catalyst in the heated gas generation apparatus is poisoned with HC or degraded and thus fails to fulfill its inherent performance, even when the fuel supply amount is accurately controlled, part of the fuel remains unburned, with HC discharged.

Thus, the present invention has been developed in view of the above-described circumstances. An object of the present invention is to provide an exhaust purification apparatus for an internal combustion engine which can detect poisoning of the catalyst in the heated gas generation apparatus with HC or degradation of the catalyst to prevent the heated gas generation apparatus from discharging HC.

CITATION LIST

Patent Literature

PTL 1: Japanese Patent Application Laid-Open No. H11-210447 (1999)

SUMMARY OF INVENTION

An aspect of the present invention provides an exhaust purification apparatus for an internal combustion engine comprising:

a heated gas generation apparatus configured to generate heated gas utilizing part of exhaust gas flowing through an exhaust passage in the internal combustion engine, the heated gas generation apparatus including a catalyst configured to provide an oxidation function, a fuel supply nozzle configured to supply fuel to the catalyst, and a heater;

a selective reduction NOx catalyst provided downstream of the heated gas generation apparatus so as to be heated by the heated gas;

an incoming gas temperature sensor configured to detect an actual incoming gas temperature of the NOx catalyst;

incoming gas temperature estimation means for estimating the incoming gas temperature of the NOx catalyst;

diagnosis means for acquiring the actual incoming gas temperature detected by the incoming gas temperature sensor and the estimated incoming gas temperature estimated by the incoming gas temperature estimation means, when at least the fuel supply nozzle of the heated gas generation apparatus is actuated, and detecting one of poisoning of the catalyst with HC and degradation of the catalyst in the heated gas generation apparatus based on a result of comparison of the values acquired.

The exhaust purification apparatus includes the diagnosis means for detecting one of the poisoning of the catalyst with HC and the degradation of the catalyst in the heated gas generation apparatus. Thus, when one of the poisoning with HC and the degradation is detected, a required measure such as inhibition of actuation of the heated gas generation apparatus can be taken. As a result, the heated gas generation apparatus can be prevented from discharging HC.

Preferably, the exhaust purification unit includes a selective reduction NOx catalyst.

Alternatively, the exhaust purification unit may include an oxidation catalyst or a particulate filter.

Preferably, the diagnosis means first detects that one of the poisoning with HC and the degradation is occurring and then carries out a predetermined poisoning recovery process. Then, the diagnosis means determines which of the poisoning with HC and the degradation is occurring. This enables diagnosis accuracy to be improved.

Preferably, the diagnosis means detects that one of the poisoning of the catalyst with HC and the degradation of the catalyst is occurring if a difference between the actual incoming gas temperature and the estimated incoming gas temperature both acquired at a first timing when at least the fuel supply nozzle of the heated gas generation apparatus is actuated is greater than a predetermined value. Then, the diagnosis means carries out the poisoning recovery process by stopping the fuel supply nozzle while actuating the heater. Thereafter, the diagnosis means actuates at least the fuel supply nozzle again and detects degradation of the catalyst if the difference between the actual incoming gas temperature and the estimated incoming gas temperature both acquired at a second timing when the fuel supply nozzle is actuated is greater than a predetermined value.

Preferably, the diagnosis means sets a time for the poisoning recovery process based on the difference between the actual incoming gas temperature and the estimated incoming gas temperature both acquired at the first timing.

Preferably, the incoming gas temperature estimation means calculates a heat storage quantity of the catalyst based on an integrated value of a difference between quantities of heat input to and output from the catalyst, and estimates the incoming gas temperature based on the heat storage quantity of the catalyst and flow rates of gas flowing into and out from the catalyst. The present invention very advantageously provides an exhaust purification apparatus for an internal combustion engine which can detect one of the poisoning of the catalyst in the heated gas generation apparatus with HC and the degradation of the catalyst to prevent the heated gas generation apparatus from discharging HC.

DESCRIPTION OF EMBODIMENTS

A preferred embodiment of the present invention will be described below with reference to the attached drawings.

Figure 1:
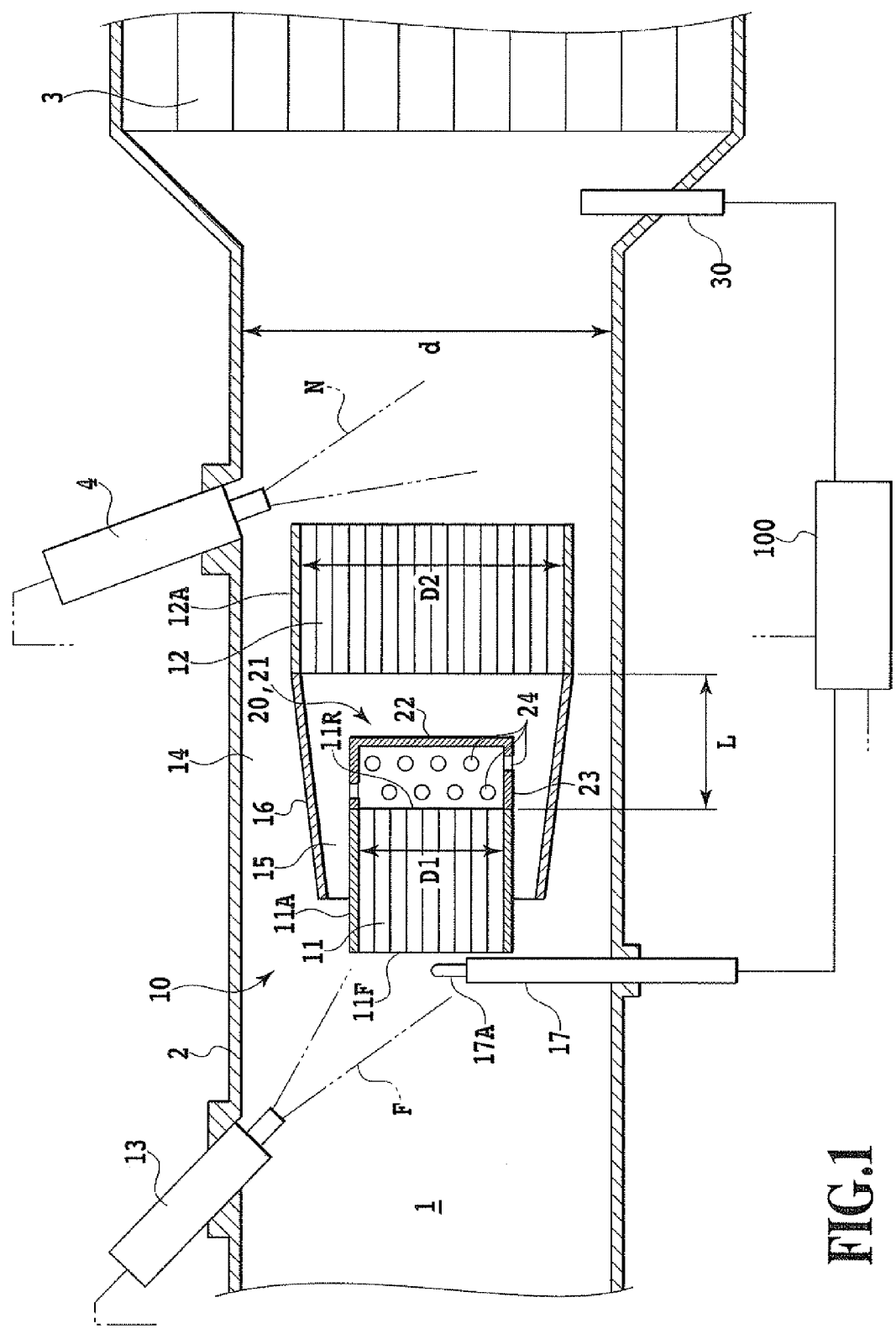
FIG. 1 is a schematic cross-sectional view of a preferred embodiment of the present invention.

An example in which the present invention is applied to a vehicle diesel engine will be described below. FIG. 1 shows an exhaust purification apparatus for an internal combustion engine according to the present embodiment. Exhaust gas flows from the left to right of the figure (see FIG. 2). The upstream side of the gas flow direction is hereinafter also referred to as the "front". The downstream side of the gas flow direction is hereinafter also referred to as the "rear".

An exhaust passage 1 is defined by an exhaust pipe 2 and includes an upstream end that is in communication with an exhaust port in the engine main body (not shown in the drawings). An NOx catalyst 3 is provided in the exhaust passage 1 to remove NOx from all of the exhaust gas flowing through the exhaust passage 1. The NOx catalyst 3 forms an exhaust purification unit.

The NOx catalyst 3 includes a selective reduction NOx catalyst (SCR: Selective Catalytic Reduction). The NOx catalyst 3 receives a supplied reducing agent containing a urea aqueous solution and continuously reduces and removes NOx from exhaust gas. For example, the NOx catalyst 3 includes a base material such as zeolite or alumina which carries rare metal such as Pt on a surface thereof or carries transition metal such as Cu or Fe on the surface thereof through ion exchange, or carries a titania/vanadium catalyst ($V_2O_5/WO_3/TiO_2$) on the surface thereof. The NOx catalyst 3 has a catalytic temperature within an active temperature range and can reduce NOx while urea aqueous solution is being supplied or added to the NOx catalyst 3. When added to the NOx catalyst, a urea aqueous solution is evaporated and hydrolyzed to generate ammonia. The ammonia reacts with NOx in the NOx catalyst, and the NOx is reduced. This reaction can be expressed by a chemical formula as follows.

$$NO+NO_2+2NH_3 \rightarrow 2N_2+3H_2O$$

A urea aqueous solution supply nozzle 4 is provided upstream of the NOx catalyst 3 to supply urea aqueous solution. The urea aqueous solution supply nozzle 4 is connected to and controlled by an electronic control unit (hereinafter referred to as the ECU) 100. A urea aqueous solution N is shown by an alternate long and two short dashes line.

As described above, the diesel engine according to the present embodiment has a relatively low exhaust temperature. Thus, the NOx catalyst 3 tends to be difficult to activate. Furthermore, in vehicle engines, the NOx catalyst 3 is installed away from a combustion chamber or installed under the floor of the vehicle and thus exposed to a wind flow. Thus, the NOx catalyst 3 tends to be difficult to activate. Moreover, there has been a demand to activate the NOx catalyst 3 earlier during the low-temperature start of the engine.

Thus, to activate the NOx catalyst 3 earlier after the engine has been started and maintain the active state, a heated gas generation apparatus 10 is provided upstream of the NOx catalyst 3 to generate heated gas utilizing part of the exhaust gas flowing through the exhaust passage 1. Since the exhaust purification apparatus includes the heated gas generation apparatus 10, heated gas generated by the heated gas generation apparatus 10 can be supplied to the NOx catalyst 3. The heated gas can be used to heat the NOx catalyst 3, thus facilitating earlier activation of the NOx catalyst and maintenance of the active state.

The heated gas generation apparatus includes a catalyst configured to provide an oxidation function and a fuel supply nozzle configured to supply fuel to the catalyst. The heated gas generation apparatus allows fuel supplied by the fuel supply nozzle to react with part of exhaust gas in the catalyst. The fuel is thus oxidized and combusted to generate heated gas. In the present embodiment, as shown in FIG. 1, the heated gas generation apparatus 10 includes two catalysts arranged in series and in two stages, that is, a front catalyst 11 and a rear catalyst 12. The fuel supply nozzle 13 injects and feeds fuel toward a front inlet portion of the front catalyst 11, which is located in the front stage. The supplied fuel F is shown by an alternate long and two short dashes line. Alternatively, the number of catalysts may be one or at least three. Each of the catalysts 11 and 12 includes an oxidation catalyst that allows hydrocarbon HC contained in the supplied fuel to react with oxygen $O_2$. Each of the catalysts 11 and 12 is constructed by dispersively forming a coat material on the surface of a carrier containing cordierite and then placing, in the coat material, a large number of rare metal particles such as Pt which serve as active spots. However, any catalyst may be used for the heated gas generation apparatus 10 provided that the catalyst provides an oxidation function. For example, a three-way catalyst may be used.

The catalysts 11 and 12 are shaped like cylinders with given diameters and include metal casings 11A and 12A, respectively, in the outer peripheral portion thereof. The catalysts 11 and 12 are arranged in the exhaust passage 1 with a gap of a predetermined length L therebetweeen. The catalysts 11 and 12 are also arranged coaxially with the exhaust passage 1. The catalysts 11 and 12 are arranged in the exhaust passage 1 so as to be floated by support members (not shown in the drawings). Each of the catalysts 11 and 12 includes a large number of cells extending in the axial direction thereof and through which gas flows. Each of the catalysts 11 and 12 is of what is called a flow through type in which gas passes independently through each cell or of what is called a wall flow type in which the front and rear ends of the cells are alternately closed in a zigzag manner so that the front end of one cell is closed, whereas the rear end of the adjacent cell is closed, allowing gas introduced into the one cell to be discharged from the adjacent cell through a partition wall (containing, for example, porous ceramic) located between the cells.

In the present embodiment, the outer diameter D2 of the rear catalyst 12 is larger than the outer diameter D1 of the front catalyst 11. Furthermore, the outer diameters D1 and D2 are smaller than the inner diameter (d) of the exhaust passage 1. Thus, rear catalyst 12 has a larger cross-sectional area than the front catalyst 11. The cross-sectional areas of both catalysts 11 and 12 are each smaller than that of the exhaust passage 1. The catalysts 11 and 12 account for a part of the cross-sectional area of the exhaust passage. Thus, part of the exhaust gas flowing through the exhaust passage 1 is introduced into the front catalyst 11. Part of the exhaust gas having failed to be introduced into the front catalyst 11 is introduced into the rear catalyst 12.

The part of the exhaust gas flowing through the exhaust passage 1 which is introduced into the front catalyst 11 is hereinafter referred to as the first part. The part of the exhaust gas flowing through the exhaust passage 1 which is introduced into the rear catalyst 12 is hereinafter referred to as the second part. Furthermore, heated gas discharged from the front catalyst 11 is hereinafter referred to as first heated gas. Heated gas discharged from the rear catalyst 12 is hereinafter referred to as second heated gas or simply heated gas. On the other hand, a main passage 14 with an annular cross section is formed radially outside the front catalyst 11 and the rear catalyst 12 so that exhaust gas (referred to as the remaining part) having failed to be introduced into the catalysts 11 and 12 flows through the main passage 14.

An introduction passage 15 is provided through which part of the exhaust gas having failed to be introduced into the front catalyst 11 is introduced into the rear catalyst 12. In the present embodiment, the introduction passage 15 is defined by a tubular member 16 extending forward from the casing 12A of the rear catalyst 12 so as to cover the outer peripheral portion of the front catalyst 11. That is, an annular space formed between the tubular member 16 and the front catalyst 11 forms the introduction passage 15. The tubular member 16 includes a rear end connected to the casing 12A and is tapered so as to have a diameter decreasing frontward. Thus, the cross-sectional area of the introduction port 15 increases rearward that is, toward the downstream side. This configuration enables a reduction in the passage resistance of the main passage 14 and the introduction port 15. The front end of the tubular member 16 is positioned slightly behind the front end of the front catalyst 11. The tubular member 16 partly covers at least the rear half of the front catalyst 11.

Various modifications may be made to the configuration of the multi-stage catalyst. For example, the front catalyst 11 and the rear catalyst 12 need not necessarily be coaxial or parallel. The front catalyst 11 and the rear catalyst 12 may be slightly offset or inclined from each other. The tubular member 16 may have a constant inner diameter and the introduction passage 15 may have a constant cross-sectional area. Furthermore, the tubular member 16 may be reversely tapered so as to have a larger diameter at the front end than at the rear end. The cross-sectional shape of the front catalyst 11 and the rear catalyst 12 is not limited to a circle but may be any other shape such as an ellipse, a semicircle, or a polygon.

The fuel supply nozzle 13 is fixedly supported by the exhaust pipe 2 and injects fuel F from the upstream side of the front catalyst 11 toward the front end surface 11F or inlet surface of the front catalyst 11. The fuel is light oil, which is fuel for engines, but fuel other than that for engines may be used. The fuel supply nozzle 13 may be configured to supply directly to the inside of the front catalyst 11. The fuel supply nozzle 13 is controlled by the ECU 100.

A heater 17 is provided in an inlet portion of the front catalyst 11. The heater 17 is electrically driven and located immediately in front of the front end surface 11F of the front catalyst 11. In particular, a heating section 17A located at the tip of the heater 17 is positioned near the center of the front end surface 11F. The heating section 17A of the heater 17 may be located inside the front catalyst 11, which may then be directly heated. The heater 17 may also be controlled by the ECU 100. The heater 17 according to the present embodiment is located such that the fuel F supplied by the fuel supply nozzle 13 is injected against the heating section 17A of the heater 17.

The provision of the heater 17 facilitates the evaporation, oxidation, and combustion of the fuel supplied by the fuel supply nozzle 13 as well as the generation of heated gas and the activation of the front catalyst 11 and the rear catalyst 12.

Furthermore, a dispersion member 20 is provided between the front catalyst 11 and the rear catalyst 12, which are arranged adjacent to each other, to disperse the first heated gas discharged from the front catalyst 11. The dispersion member 20 includes a cylindrical member 21. The cylindrical member 21 has the same outer and inner diameters as those of the casing 11A of the front catalyst 11. The cylindrical member 21 is located coaxially with the front catalyst 11. The front end of the cylindrical member 21 is open and is connected to the rear end of the casing 11A of the front catalyst 11. Thus, the cylindrical member 21 projects rearward from the front catalyst 11. The rear end of the cylindrical member 21 is closed by a closing plate 22 located opposite the rear end surface 11R of the front catalyst 11.

A plurality of holes 24 are formed in a peripheral side surface portion 23 extending in the axial direction between the front and rear ends of the cylindrical member 21. The first heated gas discharged from the front catalyst 11 into the cylindrical member 21 is then discharged in a plurality of radial directions through the respective holes 24. On the other hand, no hole is formed in the closing plate 22 of the cylindrical member 21. Thus, the closing plate 22 forms a baffle plate with which the first heated gas discharged from the front catalyst 11 collides to change its flow direction.

An incoming gas temperature sensor 30 is provided in an inlet portion of or immediately in front of the NOx catalyst 3 to detect the temperature (hereinafter referred to as the incoming gas temperature) of exhaust gas (hereinafter referred to as the incoming gas) flowing into the NOx catalyst 3. Furthermore, although not shown in the drawings, an outgoing gas temperature sensor is provided in an outlet portion of or immediately behind the NOx catalyst 3 to detect the temperature (hereinafter referred to as the outgoing gas temperature) of exhaust gas (hereinafter referred to as the outgoing gas) flowing out from the NOx catalyst 3. The incoming gas temperature sensor 30 and the outgoing gas temperature sensor are connected to the ECU 100.

The ECU 100 estimates the temperature Tc of the NOx catalyst 3 based on the incoming and outgoing gas temperatures detected by the sensors.

Now, the operation and effects of the present embodiment will be described.

Figure 2:
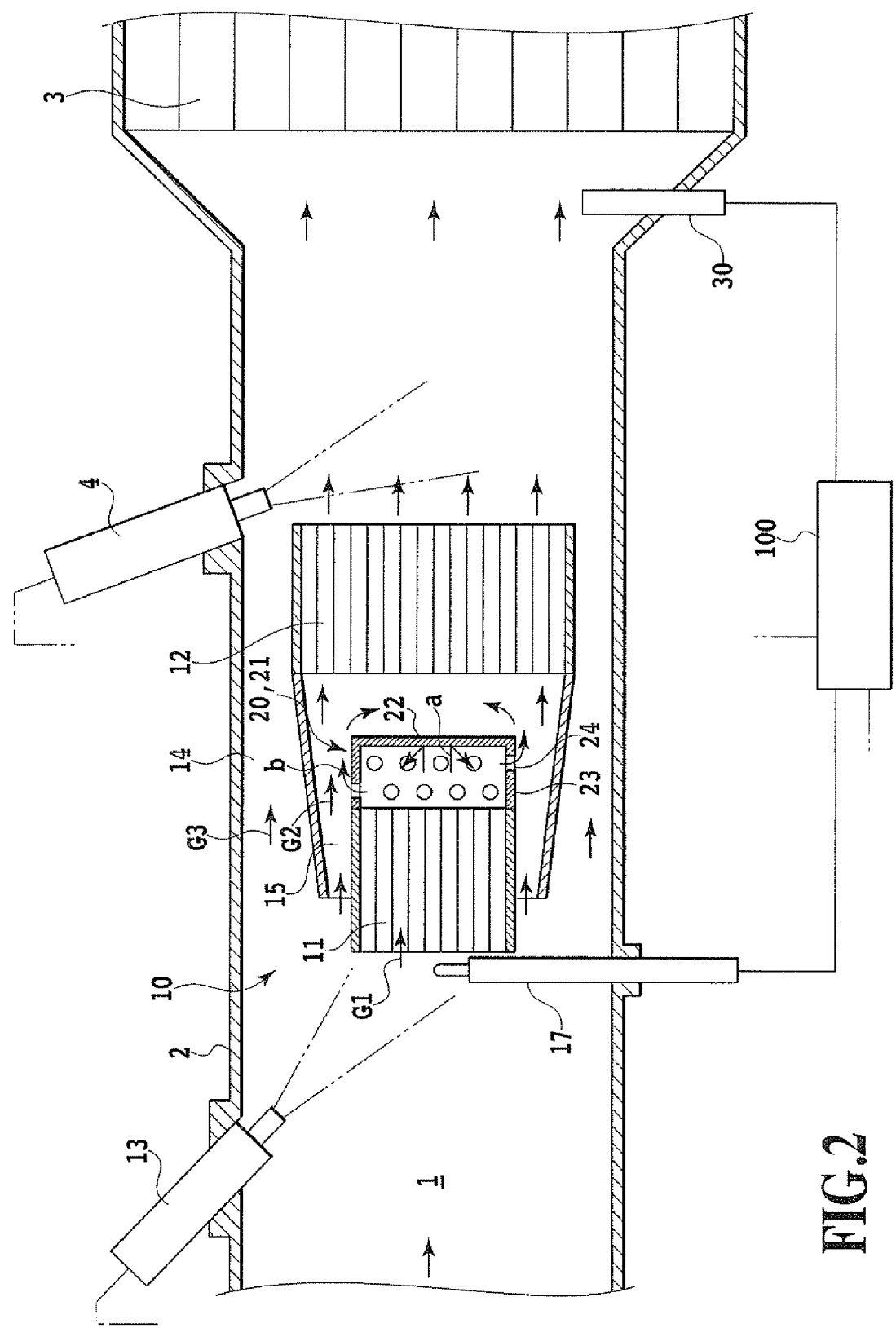
FIG. 2 is a schematic cross-sectional view illustrating the operation of the preferred embodiment.

FIG. 2 shows the flow of gas by arrows. When the heated gas generation apparatus 10 is actuated, if the engine is in operation to allow exhaust gas to flow through the exhaust passage 1, the fuel F is supplied by the fuel supply nozzle 13. On the other hand, the first part G1 of the exhaust gas is introduced into the front catalyst 11. The second part G2 of the exhaust gas flowing into the introduction passage 15 is introduced into the rear catalyst 12. During cold start or the like when the front catalyst 11 and the rear catalyst 12 are insufficiently activated, the heater 17 is simultaneously activated.

In the front catalyst 11, the oxygen and fuel F contained in the first part G1 of the exhaust gas react with each other to oxidize or combust the fuel F. In particular, since only part of the exhaust gas is introduced into the front catalyst 11, the gas flows slowly in the front catalyst 11, resulting in a sufficient reaction time. Thus, the first part G1 of the exhaust gas becomes hot, first heated gas, which is then discharged from the front catalyst 11. If the heater 17 has been actuated, since at least part of the fuel F can be oxidized and combusted, the fuel oxidation reaction in the front catalyst 11 and the activation of the front catalyst 11 are facilitated. Furthermore, first heated gas is generated which is hotter than that obtained when the heater is not actuated.

The first heated gas discharged from the front catalyst 11 may contain a non-oxidized part of the fuel, particularly HC. If the first heated gas is fed to the downstream NOx catalyst 3 without any change, problems such as poisoning of the NOx catalyst 3 with HC may occur. Thus, the first heated gas is fed to the rear catalyst 12, in which the first heated gas reacts with the second part G2 of the exhaust gas. Thus, the HC in the first heated gas is oxidized or combusted again and thus removed. As is the case with the front catalyst 11, only the second part G2 of the exhaust gas and the first heated gas are introduced into the rear catalyst 12. Hence, the gas flows slowly in the rear catalyst 12, resulting in a sufficient reaction time.

Thus, the second heated gas discharged from the rear catalyst 12, that is, the heated gas discharged from the heated gas generation apparatus 10, does not contain a sufficient amount of HC to affect the catalytic ability of the NOx catalyst 3 but is hot enough to heat the NOx catalyst 3. The oxidation reaction in the rear catalyst 12 enables the temperature of the first heated gas to be maintained or preferably enables the first heated gas to be reheated. Consequently, the rear catalyst 12 provides second heated gas significantly hotter than the remaining part G3 of the exhaust gas having passed through the main passage 14.

The second heated gas thus discharged from the rear catalyst 12 is fed to the NOx catalyst 3 to heat the NOx catalyst 3.

As described above, the present embodiment can efficiently generate heated gas available for heating the NOx catalyst 3, which is an exhaust purification catalyst. The present embodiment can thus reliably achieve early activation of the NOx catalyst 3 after the start of the engine and maintenance of the active state after the activation of the NOx catalyst.

Furthermore, if the front catalyst 11 and the rear catalyst 12 are insufficiently activated, the heater 17 is actuated to heat the first part of the exhaust gas and the front catalyst 11. Thus, the front catalyst 11 and the rear catalyst 12 can be activated earlier, and the NOx catalyst 3 can be activated earlier. Furthermore, even if the activated front catalyst 11 and rear catalyst 12 become inactive owing to a decrease in exhaust temperature or the like, the front catalyst 11 and the rear catalyst 12 can be quickly activated by actuating the heater 17.

The provision of the above-described dispersion member 20 is effective as follows. That is, given that the dispersion member 20 is not provided, the first heated gas (which is relatively rich and hot) discharged from the front catalyst 11 tends to migrate linearly rearward in the axial direction without any change to flow into the rear catalyst 12. Since the rear catalyst 12 has a larger diameter than the front catalyst 11, the first heated gas tends to flow only into the central portion of the rear catalyst 12, in other words, the portion of the rear catalyst 12 positioned immediately behind the front catalyst 11. On the other hand, the second part G2 (which is lean and cool) of the exhaust gas having passed through the introduction passage 15 tends to be introduced only into the outer peripheral portion of the rear catalyst 12, in other words, the portion of the rear catalyst 12 positioned immediately behind the introduction passage 15. Thus, the first heated gas and the second part G2 of the exhaust gas are introduced into different areas of the rear catalyst 12. As a result, oxygen is insufficient in the central portion of the rear catalyst 12, whereas the temperature and fuel are insufficient in the outer peripheral portion of the rear catalyst 12. This prevents efficient generation of heated gas.

However, when the dispersion member 20 is provided as in the case of the present embodiment, the first heated gas discharged from the front catalyst 11 can be dispersed and mixed with the second part G2 of the exhaust gas by the dispersion member 20 so as to be evenly fed through the whole rear catalyst 12. Specifically, the first heated gas flowing out from the front catalyst 11 in the axial direction collides with the closing plate 22, serving as a baffle plate, to change its flow direction (see reference character (a) in FIG. 2). The first heated gas then flows out radially outward through the plurality of holes 24 in the peripheral side surface portion 23 (see reference numeral (b) in FIG. 2). Then, the first heated gas mixes with the second part G2 of the exhaust gas flowing through the introduction passage 15. The resultant mixed gas flows to the gap between the front catalyst 11 and the rear catalyst 12, located behind the closing plate 22, and thus flows evenly through the rear catalyst 12.

Thus, the provision of the dispersion member 20 allows facilitation of mixture of the first heated gas discharged from the front catalyst 11 and the newly introduced second part of the exhaust gas. This enables a variation in oxygen concentration, fuel concentration, and temperature among the areas of the rear catalyst 12 to be suppressed, allowing heated gas to be efficiently generated.

In particular, the distance between the front catalyst 11 and the rear catalyst 12 may be reduced in order to allow the catalysts 11 and 12 to be more easily mounted in the apparatus and to reduce heat loss. However, this has a strong tendency to cause the first heated gas to flow only into the portion of the rear catalyst 12 positioned immediately behind the front catalyst 11 given that the dispersion member 20 is not provided. However, the presence of the provision member 20 enables such a partial inflow to be prevented even if the inter-catalyst distance L is short. This allows the mixed gas to flow evenly through the whole rear catalyst 12.

Meanwhile, to prevent the heated gas generation apparatus 10 or the rear catalyst 12 from discharging HC, the present embodiment includes diagnosis means for detecting one of poisoning with HC and degradation in at least one of the front catalyst 11 and the rear catalyst 12. This will be described below.

Figure 3:
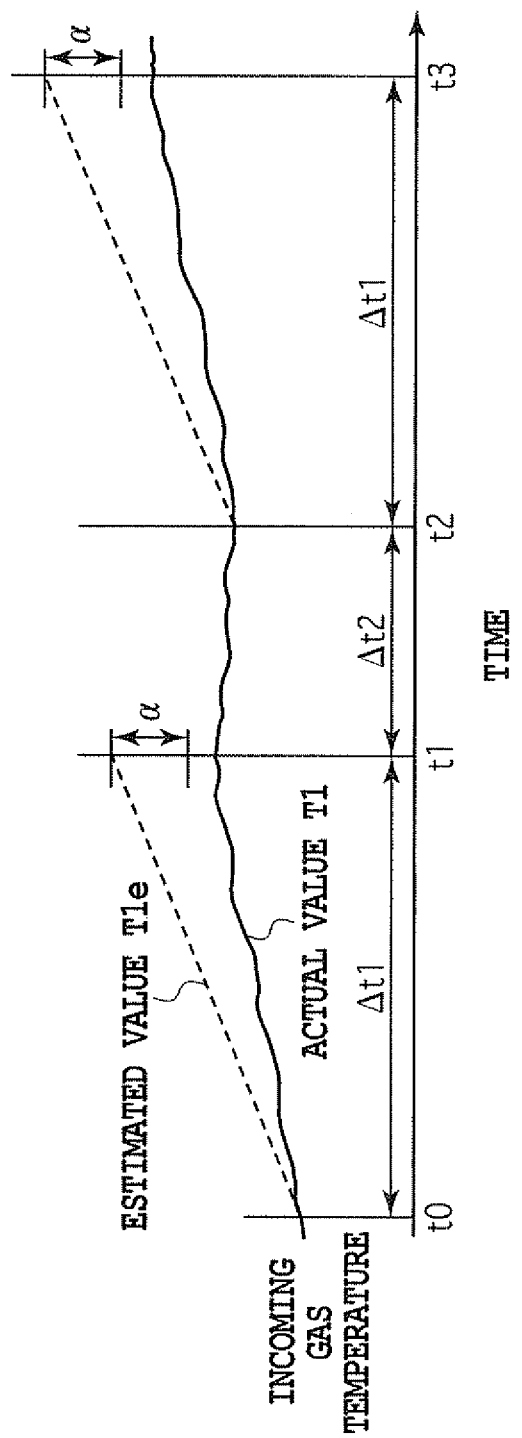
FIG. 3 is a time chart showing how the temperature of gas flowing into an NOx catalyst varies during diagnosis.

FIG. 3 shows how the incoming gas temperature of the NOx catalyst 3 varies during diagnosis. A solid line indicates an actual incoming gas temperature T1 detected by the incoming gas temperature sensor 30. A dashed line indicates an incoming gas temperature T1$e$ estimated by the ECU 100. The estimated incoming gas temperature T1$e$ is the estimated value of the incoming gas temperature obtained given that neither the front catalyst 11 nor the rear catalyst 12 is poisoned with HC or degraded (that is, both the front and rear catalysts 11 and 12 are normal). A method for estimating the incoming gas temperature will be described below. In the illustrated example, at least one of the front catalyst 11 and the rear catalyst 12 is degraded.

First, it is assumed that at time t0, the heated gas generation apparatus 10 is actuated to simultaneously actuate the fuel supply nozzle 13 and the heater 17. The actuation of the heater 17 is optional. Then, if the front catalyst 11 and the rear catalyst 12 were normal, both catalysts would be gradually warmed and the heated gas generation apparatus 10 would gradually discharge hot heated gas. Thus, the actual incoming gas temperature T1 would rise as shown by the estimated value T1$e$ in the figure.

However, in the illustrated example, one of the front catalyst 11 and the rear catalyst 12 is degraded. Thus, the actual incoming gas temperature fails to rise like the estimated incoming gas temperature; the degree of the rise in the actual incoming gas temperature is lower than that in the estimated incoming gas temperature.

In the present embodiment, the actual incoming gas temperature T1 and the estimated incoming gas temperature T1$e$ at a first timing t1 that is a predetermined time Δt1 after time t0 are acquired. The difference T1$e$−T1 between these values is determined. If the difference is greater than a relatively small predetermined value α as in the illustrated example, the apparatus detects that at least one of the front catalyst 11 and the rear catalyst 12 is poisoned with HC or degraded. On the other hand, although not shown in the drawings, if the difference is not greater than the predetermined value α, the front catalyst 11 and the rear catalyst 12 are expected to be functioning normally. Hence, the catalysts 11 and 12 are not poisoned with HC or degraded and are thus determined to be normal.

Upon detecting that one of poisoning with HC or degradation is occurring, the apparatus carries out a predetermined poisoning recovery process for recovering the catalysts 11 and 12 from poisoned with HC. In general, the catalyst poisoned with HC can be recovered by allowing relatively hot exhaust gas to flow through the catalyst for a certain amount of time. Thus, in this case, the fuel supply nozzle 13 is stopped, whereas the heater 17 is actuated so as to heat the first exhaust gas G1. Consequently, the heated first exhaust gas G1 is supplied to the front catalyst 11 and the rear catalyst 12.

The poisoning recovery process is carried out for a predetermined time Δt2. Then, at time t2, the fuel supply nozzle 13 is actuated again to resume the supply of fuel, and the heater 17 is actuated. At this time, if the cause of the abnormality is only the poisoning with HC, since the poisoning with HC has already been eliminated by the previous poisoning recovery process, the front catalyst 11 and the rear catalyst 12 operate normally. Thus, the heated gas generation apparatus 10 discharges sufficiently hot heated gas to raise the actual incoming gas temperature T1 like the estimated value T1$e$ in FIG. 3.

However, in the illustrated example, at least one of the front catalyst 11 and the rear catalyst 12 is degraded. Thus, the actual incoming gas temperature T1 fails to rise in the same manner as that in which the estimated incoming gas temperature T1$e$ increases.

In the present embodiment, the actual incoming gas temperature T1 and the estimated incoming gas temperature T1$e$ at a second timing t3 that is a predetermined time Δt1 after time t2 are acquired. The difference T1$e$−T1 between these values is determined. If the difference is greater than the predetermined value α as in the illustrated example, the apparatus detects that at least one of the front catalyst 11 and the rear catalyst 12 is degraded. On the other hand, although not shown in the drawings, if the difference is not greater than the predetermined value α, at least one of the front catalyst 11 and rear catalyst 12 previously poisoned with HC has already been recovered. Hence, the apparatus determines both the catalysts 11 and 12 to be normal.

As described above, one of the poisoning with HC and degradation of the catalysts 11, 12 is distinctively detected. Thus, diagnosis accuracy can be improved.

Now, a method in which the ECU 100 estimates the incoming gas temperature will be described.

Here, the front catalyst 11 and the rear catalyst 12 are considered to be one catalyst and are denoted by reference numeral 40. Terms are defined as follows. The quantity of heat flowing into the catalyst 40 in the heated gas generation apparatus 10 is defined as an "input heat quantity A". The quantity of heat flowing out from the catalyst 40 in the heated gas generation apparatus 10 is defined as an "output heat quantity B". The quantity of heat stored in the catalyst 40 in the heated gas generation apparatus 10 is defined as a "heat storage quantity C". The flow rate of exhaust gas flowing into the catalyst 40 in the heated gas generation apparatus 10 is defined as an "incoming gas flow rate D". The amount by which the temperature of exhaust gas (containing heated gas) flowing into the NOx catalyst 3 rises is defined as an "incoming gas temperature rise amount E". The flow rate of the whole exhaust gas flowing through the exhaust passage 1 is defined as an "exhaust flow rate Ge".

Figure 4:
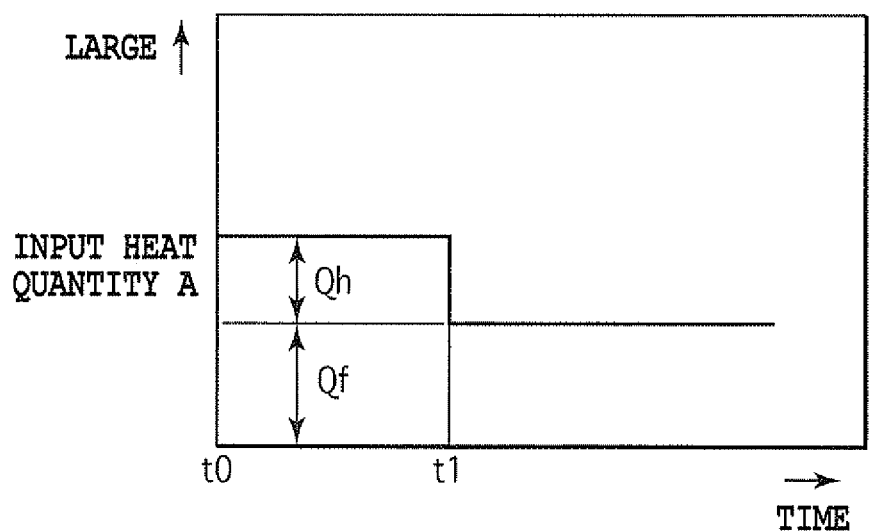
FIG. 4 is a graph relating the quantity of heat input to a catalyst in a heated gas generation apparatus.

The input heat quantity A of heat input to the catalyst 40 is equal to the sum of heat Qh from the heater 17 and oxidation heat Qf from the supplied fuel. As shown in FIG. 4, during a period between t0 and t1 when both the fuel supply nozzle 13 and the heater 17 are in operation, the heat A=Qh+Qf flows into the catalyst 40 in the heated gas generation apparatus 10. Furthermore, during a period after t1 when only the fuel supply nozzle 13 is in operation, whereas the heater 17 is stopped, the heat A=Qf flows into the catalyst 40 in the heated gas generation apparatus 10.

On the other hand, the output heat quantity B of heat output from the catalyst 40 is determined by the heat storage quantity C of heat stored in the catalyst 40 and the incoming gas flow rate D of gas flowing into the catalyst 40. That is, the output heat quantity B increases consistently with the heat storage quantity C and thus the incoming gas flow rate D. In the present embodiment, B=C×D.

The heat storage quantity C of the catalyst 40 is equal to the output heat quantity B subtracted from the input heat quantity A.

Figure 5:
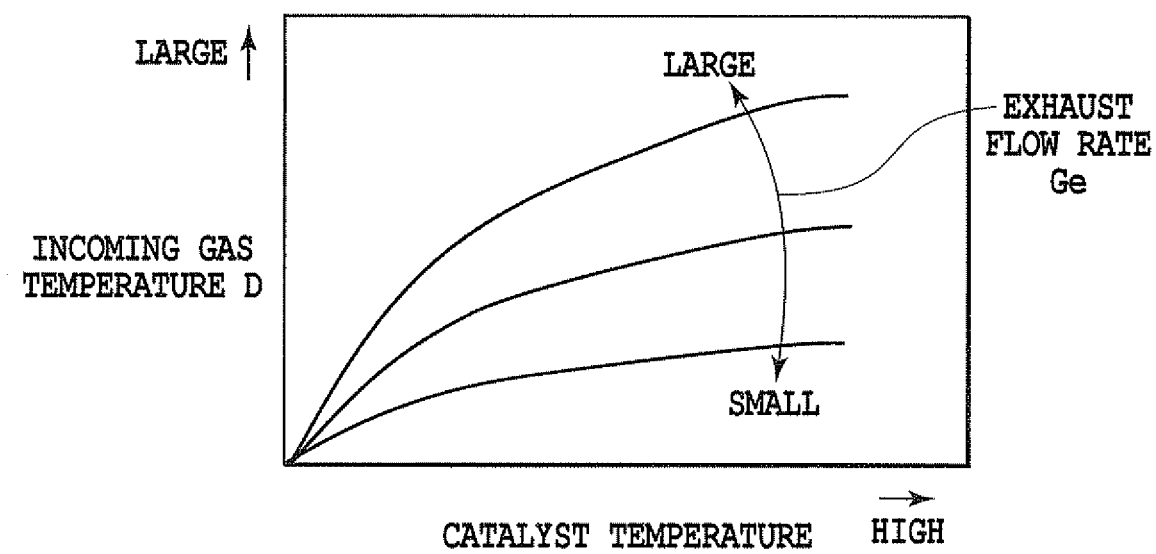
FIG. 5 is a graph showing the relationship among the incoming gas flow rate into the catalyst, exhaust flow rate, and the catalyst temperature.

The incoming gas flow rate D of gas flowing into the catalyst 40 increases consistently with the exhaust flow rate Ge. However, the rate of increase in the incoming gas flow rate D tends to decrease with increasing temperature of the catalyst 40 because the viscosity of the gas inside the catalyst increases consistently with the catalyst temperature. This is indicated in FIG. 5. Thus, the incoming gas flow rate D is a function of the exhaust gas flow rate Ge and the temperature of the catalyst 40.

Based on the above-described knowledge, the ECU 100 calculates or updates the heat storage quantity C of the catalyst 40 in accordance with the following equation, where (n) denotes the current value and n−1 denotes the last value.

[Expression 1]

$$Cn = \Sigma\{A_{n-1} - (C_{n-1} \times D_{n-1})\} \quad (1)$$

Here, a predetermined value corresponding to the operation conditions of the fuel supply nozzle 13 and the heater 17 is used for the input heat quantity A of heat input to the catalyst 40. Furthermore, the incoming gas flow rate D of gas flowing into the catalyst 40 is calculated from such a map or function as shown in FIG. 5 based on the exhaust flow rate Ge and the temperature of the catalyst 40. The exhaust flow rate Ge may be directly detected, but in the present embodiment, the intake air flow rate Ga of the engine detected by an air flow meter (not shown in the drawings) is used as a substitute for the exhaust flow rate Ge. Furthermore, since the heat storage quantity C of the catalyst 40 is a function of the temperature of the catalyst 40 and the heat capacity, the temperature Dn of the catalyst 40 is calculated based on the heat storage quantity Cn of the catalyst 40 obtained at the same timing.

Σ means an integrated value. The ECU 100 sequentially integrates and updates the heat storage quantity $C_n$ at every sampling period from engine start to determine the current heat storage quantity C.

Once the heat storage quantity C of the catalyst 40 is calculated, the ECU 100 calculates the incoming gas temperature increase amount E of the gas flowing into the NOx catalyst 3, at every sampling period in accordance with:

[Expression 2]

$$E_n = f\left\{\frac{C_n \times D_n}{Ge_n}\right\} \quad (2)$$

That is, the incoming gas temperature increase amount $E_n$ for every sampling period is a function in which the output heat quantity $B_n$ is divided by the exhaust flow rate $Ge_n$. The incoming gas temperature increase amount $E_n$ increases consistently with output heat quantity $B_n$ and with decreasing exhaust flow rate $Ge_n$.

The ECU 100 integrates the incoming gas temperature increase amount $E_n$ at every sampling period from the points t0 and t2 of estimation start as shown in FIG. 3. On the other hand, ECU 100 separately estimates the incoming gas temperature obtained given that the heated gas generation apparatus 10 is not provided (this incoming gas temperature is hereinafter referred to as the reference incoming gas temperature), based on the engine operation condition. The ECU 100 adds the integrated value of the incoming gas temperature increase amount $E_n$ to the separately estimated reference incoming gas temperature to determine an estimated incoming gas temperature T1e.

Figure 6:
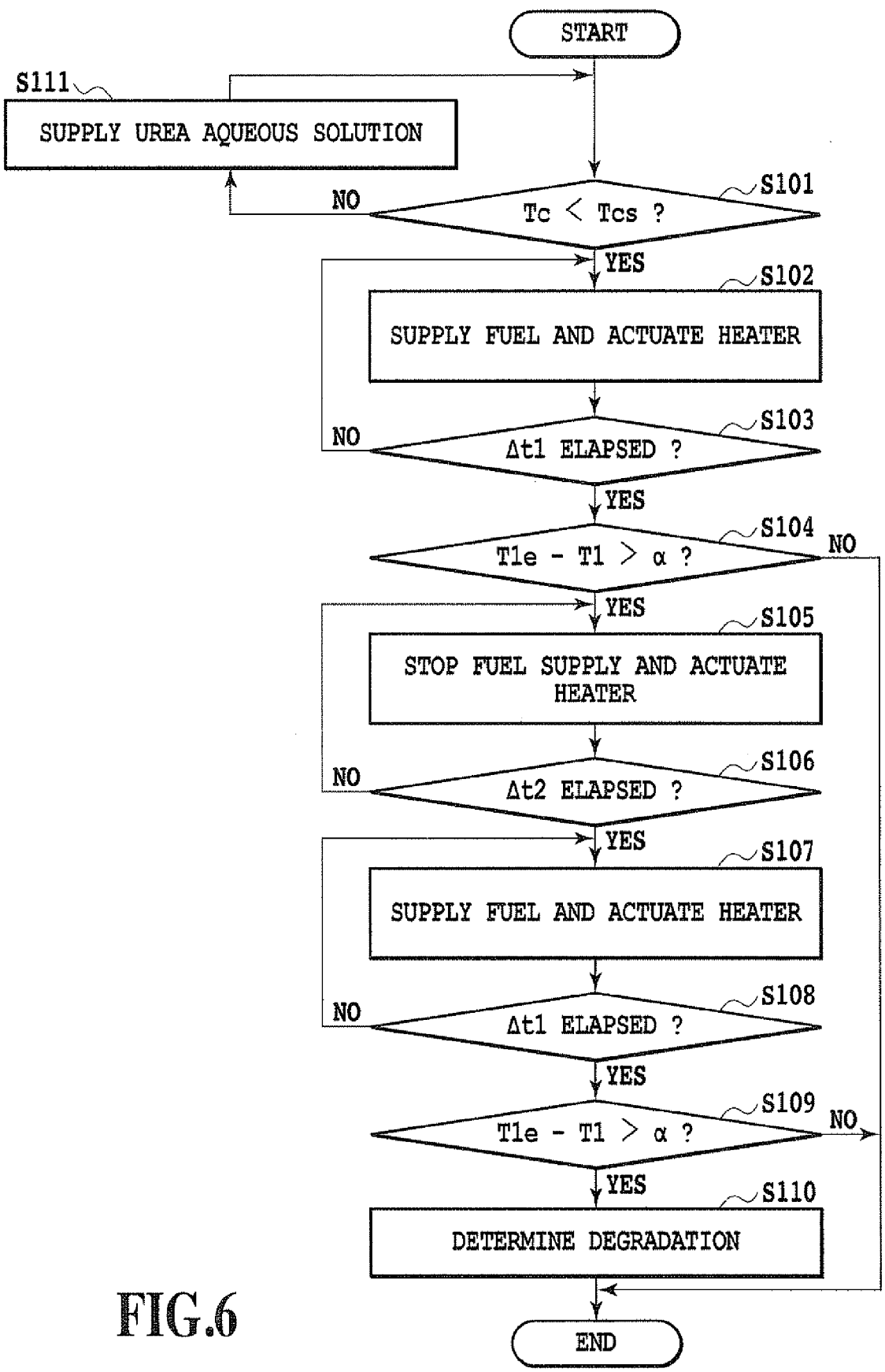
FIG. 6 is a flowchart showing the procedure of diagnosis and urea aqueous solution supply control.

Now, the procedure of diagnosis and urea aqueous solution supply control carried by the ECU 100 will be described with reference to FIG. 6.

In step S101, the ECU 100 determines whether or not the estimated catalyst temperature Tc of the NOx catalyst 3 is lower than a predetermined value Tcs (for example, 200° C.) corresponding to the lower limit of the activation temperature.

If Tc≥Tcs, the NOx catalyst 3 is considered to be active. In step S111, the urea aqueous solution supply nozzle 4 is actuated to allow the urea aqueous solution supply nozzle 4 to supply a urea aqueous solution.

On the other hand, if Tc<Tcs, the procedure proceeds to step S102 to actuate the fuel supply nozzle 13 and the heater 17. Thus, both fuel supply by the fuel supply nozzle 13 and heating by the heater 17 are carried out.

Then, in step S103, the ECU 100 determines whether or not a predetermined time Δt1 has elapsed since the time of actuation start of the fuel supply nozzle 13 and the heater 17. If the predetermined time Δt1 has not elapsed, step S102 is continued. If the predetermined time Δt1 has elapsed, the procedure proceeds to step S104. This timing of shifting to step S104 corresponds to the first timing t1 (FIG. 3).

In step S104, the values of the estimated incoming gas temperature T1e and the actual incoming gas temperature T1 are acquired, and the difference T1e−T1 is calculated. The ECU 100 then determines whether or not the difference is greater than the predetermined value α. If T1e−T1>α, the ECU 100 determines that at least one of the front catalyst 11 and the rear catalyst 12 is poisoned with HC or degraded. The procedure then shifts to the poisoning recovery process in step S105. On the other hand, if T1e−T1≤α, the ECU 100 determines that both the front catalyst 11 and the rear catalyst 12 are normal, and terminates the procedure.

In step S105, the fuel supply nozzle 13 is stopped, and the heater 17 is actuated. Thus, the fuel supply by the fuel supply nozzle 13 is stopped, and only the heating by the heater 17 is carried out.

Figure 7:
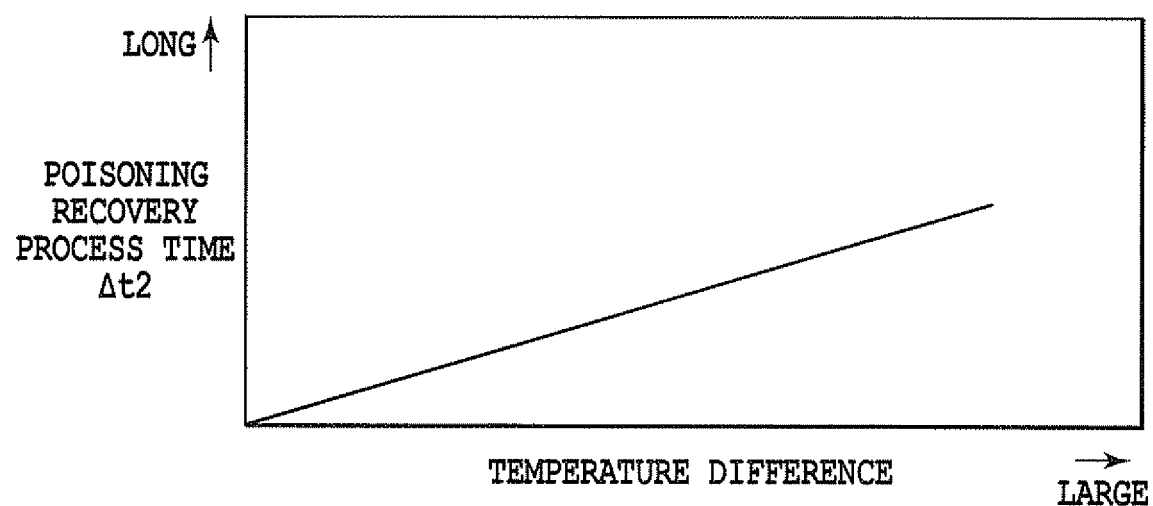
FIG. 7 is a map defining the relationship between a temperature difference and a poisoning recovery process time.

Here, the poisoning recovery process in step S105 is carried out for a predetermined time Δt2. However, if at least one of the front catalyst 11 and the rear catalyst 12 is poisoned with HC, the poisoning condition is considered to be severer when the temperature difference T1e−T1 at the first timing t1 is greater. Thus, in the present embodiment, the ECU 100 sets the poisoning recovery process time Δt2 based on the temperature difference T1e−T1. Specifically, the ECU 100 sets a longer poisoning recovery time Δt2 for a greater temperature difference T1e−T1 based on such a map or function as shown in FIG. 7. This enables a more appropriate poisoning recovery process to be carried out.

Then, in step S106, the ECU determines whether or not the predetermined time Δt2 has elapsed since the actuation start of the heater 17. If the predetermined time Δt2 has not elapsed, step S105 is continued. If the predetermined time Δt2 has elapsed, the procedure proceeds to step S107. This timing of shifting to step S107 corresponds to t2 shown in FIG. 3.

In step S107, the fuel supply nozzle 13 and the heater 17 are actuated. Thus, both fuel supply by the fuel supply nozzle 13 and heating by the heater 17 are carried out.

Then, in step S108, the ECU determines whether or not the predetermined time Δt1 has elapsed since the actuation start of the fuel supply nozzle 13 and the heater 17. If the predetermined time Δt1 has not elapsed, step S107 is continued. If the predetermined time Δt1 has elapsed, the procedure proceeds to step S109. This timing of shifting to step S109 corresponds to the second timing t3 (FIG. 3).

In step S109, the values of the estimated incoming gas temperature T1e and the actual incoming gas temperature T1 are acquired, and the difference therebetween T1e−T1 is calculated. The ECU 100 then determines whether or not the difference is greater than the predetermined value α.

If T1e−T1≤α, the ECU 100 determines that at least one of the front catalyst 11 and rear catalyst 12 previously poisoned with HC has already been recovered. The ECU 100 also determines that both the front catalyst 11 and the rear catalyst 12 are normal, and terminates the procedure.

On the other hand, if T1e−T1>α, this is a case where both catalysts 11, 12 fails to be recovered to the normal condition in spite of carrying out the poisoning recovery process. Thus, the procedure proceeds to step S110, where the ECU 100 determines that at least one of the front catalyst 11 and the rear catalyst 12 is degraded, and the procedure is terminated. In this case, a warning device (not shown in the drawings) is preferably actuated in order to notify the user of the degradation. Furthermore, the catalyst 11 or 12 may operate abnormally to discharge HC. Thus, preferably, the fuel supply nozzle 13 is inhibited from operating or the amount of fuel supplied by the fuel supply nozzle 13 is reduced.

As described above, diagnosis is carried out before the NOx catalyst 3 is activated. The present embodiment can thus detect that the catalyst 11 or 12 is poisoned with HC or degraded before a urea aqueous solution starts to be supplied. This enables the supply of a urea aqueous solution to be prevented from being carried out with HC discharged.

The embodiment of the present invention has been described. However, other embodiments of the present invention can be adopted. For example, the present invention is applicable to internal combustion engines other than the diesel engine, that is, the compression-ignition internal combustion engine. The present invention is applicable to, for example, a spark-ignition internal combustion engine, particularly a direct-injection lean burn gasoline engine.

(1) The number of catalysts in the heated gas generation apparatus is not limited to two. More catalysts, for example, three or four catalysts, may be provided. For example, if two catalysts are provided and undesirable HC is discharged from the second (final) catalyst, the number of catalysts may be increased to, for example, three so that the third catalyst removes HC components. In any case, the number of catalysts may be determined as required so as to prevent the final catalyst from discharging HC.

(2) The fuel supply nozzle in the heated gas generation apparatus is essential for the front catalyst, that is, the first catalyst. However, the fuel supply nozzle may also be provided for the intermediate or final catalyst.

Figure 8:
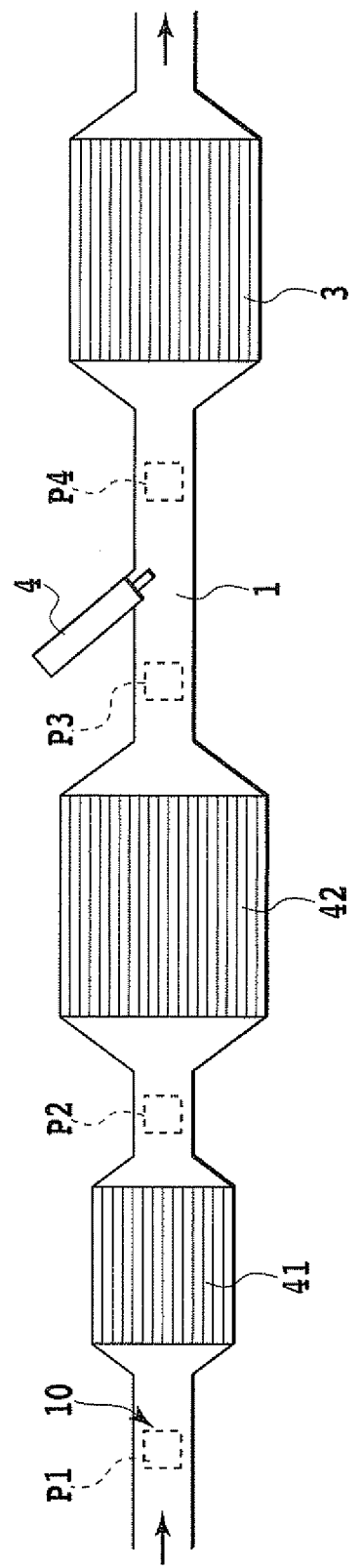
FIG. 8 is a schematic diagram showing various positions at which the heated gas generation apparatus is installed.

(3) The heated gas generation apparatus 10 may be installed at any of the following various positions. FIG. 8 shows the various positions where the heated gas generation apparatus 10 may be installed. In FIG. 8, reference numerals 41, 42, and 3 denote an oxidation catalyst, a particulate filter, and a selective reduction NOx catalyst, respectively. Each of the oxidation catalyst, the particulate filter, and the selective reduction NOx catalyst forms an exhaust purification unit. In the illustrated example, the oxidation catalyst 41, the particulate filter 42, and the selective reduction NOx catalyst 3 are provided in series in this order from the upstream side (left) of the exhaust passage 1.

The exhaust purification unit refers to any unit configured to purify exhaust gas. The exhaust purification units include exhaust purification catalysts such as an oxidation catalyst, an NOx catalyst, and a three-way catalyst, and a particulate filter configured to catch particulates in the exhaust gas. The particulate filter may be of a self-recovery type that carries a catalyst or may be recovered by heat from an external heater. The particulate filter is hereinafter simply referred to as a "filter". The NOx catalyst includes a storage reduction type in addition to the selective reduction type.

The heated gas generation apparatus 10 can be installed at a first position P1 to a fourth position P4 as shown in FIG. 8. If the heated gas generation apparatus 10 is installed at the first position P1, an oxidation catalyst 41 is provided after the heated gas generation apparatus 10 in the direction of exhaust gas in the exhaust passage 1 (from left to right as shown by arrows). Similarly, if the heated gas generation apparatus 10 is installed at the second position P2, a filter 42 is provided after the heated gas generation apparatus 10. If the heated gas generation apparatus 10 is installed at the third or fourth position P3 or P4, a selective reduction NOx catalyst 3 is provided after the heated gas generation apparatus 10.

In particular, the heated gas generation apparatus 10 installed at the third position P3 is positioned upstream of the urea aqueous solution supply nozzle 4. The heated gas generation apparatus 10 installed at the fourth position P4 is positioned downstream of the urea aqueous solution supply nozzle 4. The third position P3 corresponds to the installation position in the above-described basic embodiment.

The heated gas generation apparatus 10 is simplified in the figure but includes the above-described fuel supply nozzle 13 and heater 17. Furthermore, the incoming gas temperature sensor 30 is also not illustrated but is provided in order to detect the incoming gas temperature of the exhaust purification unit located immediately after the heated gas generation apparatus 10 as described above.

Regardless of wherever the heated gas generation apparatus 10 is installed, the heated gas generation apparatus 10 can exert its inherent effect, that is, can heat the downstream exhaust purification unit using generated heated gas. The heated gas generation apparatus 10 installed at the first position P1 is advantageous for improving the activity of the oxidation catalyst 42 located immediately after the heated gas generation apparatus 10 and thus improving the recovery capability of the succeeding filter 42. The recovery of the filter 42 is a process of oxidizing and combusting particulates and requires hot exhaust gas. Thus, the supply of heated gas from the heated gas generation apparatus 10 is advantageous.

The heated gas generation apparatus 10 installed at the second position P2 is advantageous for improving the recovery capability of the filter 42 and suppressing thermal degradation of the oxidation catalyst 41. Fuel is separately added to the oxidation catalyst 41, which normally reaches a high temperature of 600 to 700° C. Thus, hot gas is supplied to the downstream exhaust purification unit. However, the heated gas generation apparatus 10 located at the second position P2 similarly generates heated gas and enables a reduction in loads on the oxidation catalyst 41 and in the amount by which the oxidation catalyst 41 needs to raise the temperature. That is, the generation of heated gas can be shared by the oxidation catalyst 41 and the heated gas generation apparatus 10. Hence, this configuration is advantageous for suppressing thermal degradation of the oxidation catalyst 41.

The advantages of the heated gas generation apparatus 10 installed at the third position 23 are as described above. The heated gas generation apparatus 10 installed at the fourth position P4 is advantageous for activating the NOx catalyst. The heated gas generation apparatus 10 installed at the third or fourth position is advantageous for promoting hydrolysis of a urea aqueous solution supplied by the urea aqueous solution supply nozzle 4 and improving dispersability of the urea aqueous solution. The heated gas generation apparatus 10 installed at the third or fourth position is advantageous for improving the performance of the NOx catalyst 3.

When diagnosis means is provided for detecting that the catalyst 11 or 12 in the heated gas generation apparatus 10 is poisoned with HC or degraded as in the present invention, the heated gas generation apparatus 10 is prevented from discharging HC. Hence, regardless of the installation position, the diagnosis means is advantageous as follows.

If the heated gas generation apparatus 10 is installed at the third position 23, the diagnosis means is advantageous as described above. If the heated gas generation apparatus 10 is installed at the fourth position, the NOx catalyst 3 can be prevented from being poisoned with HC discharged from the heated gas generation apparatus 10.

If the heated gas generation apparatus 10 is installed at the first position 21, even when the heated gas generation apparatus 10 discharges HC, the oxidation catalyst 41 located immediately after the heated gas generation apparatus 10 can purify the discharged HC provided that the amount of the HC is very small. However, basically, a sufficient amount of fuel to heat the oxidation catalyst 41 to a desired high temperature is added to the oxidation catalyst 41. Thus, when the heated gas generation apparatus 10 discharges an unexpected amount of HC, all of the discharged HC may not be purified by the oxidation catalyst 41. Then, the oxidation catalyst 41 may discharge HC to inhibit the reaction between ammonia and NOx in the downstream NOx catalyst 3 or poison the NOx catalyst 3 with HC. Moreover, the temperature of the oxidation catalyst 41 may be excessively increased to promote thermal degradation. Given that only a combination of the heated gas generation apparatus 10 and the oxidation catalyst 41 is present in the exhaust passage 1, HC discharged from the oxidation catalyst 41 may be released to the atmosphere.

However, the provision of the diagnosis means according to the present invention allows these problems to be solved.

Next, if the heated gas generation apparatus 10 is installed at the second position P2, HC discharged from the heated gas generation apparatus 10 is likely to simply pass through the filter 42 to the downstream side thereof. If the filter 42 includes a catalyst, discharged HC can be purified. However, the effect of the purification is insignificant and not so promising. Thus, HC discharged from the filter 42 may inhibit the reaction between ammonia and NOx in the downstream NOx catalyst 3 or poison the NOx catalyst 3 with HC. Given that only a combination of the heated gas generation apparatus 10 and the filter 42 is present in the exhaust passage 1, HC discharged from the filter 42 may be released to the atmosphere.

However, the provision of the diagnosis means according to the present invention allows these problems to be solved.

If the heated gas generation apparatus 10 is installed at the first position P1 or the second position P2, a plurality of exhaust purification units are provided downstream of the heated gas generation apparatus 10. This case also falls within the scope of the present invention. Furthermore, the heated gas generation apparatus 10 may be provided at two or more of the first to fourth positions P1 to P4. This case also falls within the scope of the present invention. The embodiments of the present invention are not limited to those described above. The present invention includes any modifications and equivalents embraced in the concepts of the present invention defined by the claims. Thus, the present invention should not be interpreted in a limited manner but is applicable to any other techniques falling within the spirit of the present invention.

The invention claimed is:

1. An exhaust purification apparatus for an internal combustion engine comprising:
    a heated gas generation apparatus configured to generate heated gas utilizing part of exhaust gas flowing through an exhaust passage in the internal combustion engine, the heated gas generation apparatus including a catalyst configured to provide an oxidation function, a fuel supply nozzle configured to supply fuel to the catalyst, and a heater;
    an exhaust purification unit provided downstream of the heated gas generation apparatus so as to be heated by the heated gas;
    an incoming gas temperature sensor configured to detect an actual incoming gas temperature of the exhaust purification unit;
    an incoming gas temperature estimation unit configured to estimate the incoming gas temperature of the exhaust purification unit; and
    a diagnosis unit configured to acquire the actual incoming gas temperature detected by the incoming gas temperature sensor and the estimated incoming gas temperature estimated by the incoming gas temperature estimation unit, when at least the fuel supply nozzle of the heated gas generation apparatus is actuated, and detecting one of poisoning of the catalyst with HC and degradation of the catalyst in the heated gas generation apparatus based on a result of comparison of the actual incoming gas temperature and the estimated incoming gas temperature acquired,
    wherein the diagnosis unit first detects that one of the poisoning of the catalyst with HC and the degradation of the catalyst is occurring and then carries out a predetermined poisoning recovery process for recovering the catalyst from being poisoned with HC, and thereafter determines which of the poisoning with HC and the degradation is occurring, and
    wherein the diagnosis unit detects that one of the poisoning of the catalyst with HC and the degradation of the catalyst is occurring if a difference between the actual incoming gas temperature and the estimated incoming gas temperature both acquired at a first timing when at least the fuel supply nozzle of the heated gas generation apparatus is actuated is greater than a predetermined value, and then the diagnosis unit carries out the poisoning recovery process by stopping the fuel supply nozzle while actuating the heater, and thereafter the diagnosis unit actuates at least the fuel supply nozzle again and detects degradation of the catalyst if the difference between the actual incoming gas temperature and the estimated incoming gas temperature both acquired at a second timing when the fuel supply nozzle is actuated is greater than a predetermined value.

2. The exhaust purification apparatus for the internal combustion engine according to claim 1, wherein the exhaust purification unit comprises a selective reduction NOx catalyst.

3. The exhaust purification apparatus for the internal combustion engine according to claim 1, wherein the exhaust purification unit comprises an oxidation catalyst or a particulate filter.

4. The exhaust purification apparatus for the internal combustion engine according to claim 1, wherein the diagnosis unit sets a time for the poisoning recovery process based on the difference between the actual incoming gas temperature and the estimated incoming gas temperature both acquired at the first timing.

5. The exhaust purification apparatus for the internal combustion engine according to claim 1, wherein the incoming gas temperature estimation unit calculates a heat storage quantity of the catalyst based on an integrated value of a difference between quantities of heat input to and output from the catalyst, and estimates the incoming gas temperature based on the heat storage quantity of the catalyst and flow rates of gas flowing into and out from the catalyst.

* * * * *